US009020555B2

(12) United States Patent
Venkatraman et al.

(10) Patent No.: US 9,020,555 B2
(45) Date of Patent: Apr. 28, 2015

(54) SYSTEM AND METHOD FOR PERFORMANCE ENHANCEMENT IN HETEROGENEOUS WIRELESS ACCESS NETWORK EMPLOYING DISTRIBUTED ANTENNA SYSTEM

(75) Inventors: Shankar Venkatraman, Irvine, CA (US); Khurram P. Sheikh, San Clemente, CA (US)

(73) Assignee: Intel Corporation, Santa Clara, CA (US)

( * ) Notice: Subject to any disclaimer, the term of this patent is extended or adjusted under 35 U.S.C. 154(b) by 964 days.

(21) Appl. No.: 13/079,558

(22) Filed: Apr. 4, 2011

(65) Prior Publication Data
US 2011/0244914 A1 Oct. 6, 2011

Related U.S. Application Data

(60) Provisional application No. 61/321,113, filed on Apr. 5, 2010.

(51) Int. Cl.
| | |
|---|---|
| *H04B 7/00* | (2006.01) |
| *H04W 52/40* | (2009.01) |
| *H04W 52/14* | (2009.01) |
| *H04W 52/26* | (2009.01) |

(52) U.S. Cl.
CPC ............ *H04W 52/40* (2013.01); *H04W 52/143* (2013.01); *H04W 52/267* (2013.01)

(58) Field of Classification Search
USPC ........................ 455/522, 69–70; 370/315–320
See application file for complete search history.

(56) References Cited

U.S. PATENT DOCUMENTS

| | | |
|---|---|---|
| 6,411,817 B1 | 6/2002 | Cheng et al. |
| 6,580,905 B1 * | 6/2003 | Naidu et al. .................. 455/522 |
| 6,587,690 B1 | 7/2003 | Di Huo et al. |

(Continued)

FOREIGN PATENT DOCUMENTS

| | | |
|---|---|---|
| WO | 2009/061106 A2 | 5/2009 |
| WO | 2009/134180 A1 | 11/2009 |
| WO | 2009/134200 A1 | 11/2009 |

OTHER PUBLICATIONS

International Search Report and Written Opinion pertaining to International Application No. PCT/US2012/032184 dated Jul. 10, 2012.

(Continued)

*Primary Examiner* — Fayyaz Alam
(74) *Attorney, Agent, or Firm* — Schwegman Lundberg & Woessner, P.A.; Anthony P. Curtis

(57) ABSTRACT

A system and method for dynamically optimizing the performance of indoor distributed antenna systems communicate to user equipment is disclosed. The user equipment measures information describing the downlink signals such as the downlink data rates, the quality of the received signal, and the location of the user equipment. A service module collects this information and determines an optimized power level for each of the antenna units. The service module may optimize only one antenna unit power level or a subset of the antenna units within the distributed antenna system in a preferred embodiment. One or more of the antenna units then transmits downlink signals with the optimized power levels. The optimized power level may be less than the initial power level in a preferred embodiment. As a result, the performance of the indoor distributed antenna systems is enhanced.

20 Claims, 2 Drawing Sheets

(56) References Cited

U.S. PATENT DOCUMENTS

| | | |
|---|---|---|
| 6,690,939 B1 | 2/2004 | Jonsson et al. |
| RE41,936 E | 11/2010 | Woodhead et al. |
| 8,582,536 B2* | 11/2013 | Laroia et al. .................. 370/332 |
| 2002/0094833 A1* | 7/2002 | Lieshout et al. .............. 455/522 |
| 2005/0136961 A1* | 6/2005 | Simonsson et al. ........... 455/522 |
| 2007/0042798 A1 | 2/2007 | Chen et al. |
| 2008/0186107 A1 | 8/2008 | Rhodes et al. |
| 2008/0214196 A1* | 9/2008 | Sambhwani et al. ......... 455/446 |
| 2008/0252522 A1 | 10/2008 | Asbridge |
| 2009/0080349 A1 | 3/2009 | Rofougaran |
| 2009/0285158 A1 | 11/2009 | Rezaiifar |
| 2010/0080137 A1 | 4/2010 | Vedantham et al. |
| 2010/0144282 A1* | 6/2010 | Laroia et al. ................. 455/63.3 |
| 2010/0202392 A1 | 8/2010 | Zhang et al. |
| 2011/0244853 A1 | 10/2011 | Sheikh et al. |
| 2012/0196611 A1 | 8/2012 | Venkatraman et al. |

OTHER PUBLICATIONS

International Search Report and Written Opinion for International Application No. PCT/US2011/030807 dated Jun. 13, 2011, 9 pages.
Office Action dated May 14, 2012 from U.S. Appl. No. 13/077,556.
International Preliminary Report on Patentability for International Application No. PCT/US2011/030804 dated Oct. 11, 2012, 8 pages.
Supplementary European Search Report for related European application 12767271.5, dated Aug. 7, 2014, 6 pp.

* cited by examiner

SYSTEM AND METHOD FOR PERFORMANCE ENHANCEMENT IN HETEROGENEOUS WIRELESS ACCESS NETWORK EMPLOYING DISTRIBUTED ANTENNA SYSTEM

RELATED APPLICATION INFORMATION

The present application claims priority under 35 U.S.C. Section 119(e) to U.S. Provisional Patent Application Ser. No. 61/321,113 filed Apr. 5, 2010, the disclosure of which is incorporated herein by reference in its entirety.

BACKGROUND OF THE INVENTION

1. Field of the Invention

The present invention relates generally to methods and systems related to wireless telephony. More particularly, the invention relates to wireless systems employing distributed antenna systems and related methods.

2. Description of the Prior Art and Related Background Information

Modern wireless telephone systems often employ distributed antenna systems ("DAS") for communicating with users within a cell region. The transmission power for the DAS must be optimized to enhance the network capacity. However, conventional wireless systems do not optimize cell capacity based on the real-time requirements of the users within the cell region.

Accordingly, a need exists to optimize the performance of wireless telephone systems employing distributed antenna systems.

SUMMARY OF THE INVENTION

In a first aspect the present invention provides a method for optimizing downlink transmission power of a distributed antenna system, comprising providing a common downlink signal to a plurality of separate antenna units in a distributed antenna system and varying gain of the antenna units to enhance system performance based on collected user information.

In a preferred embodiment the method for optimizing the downlink transmission power of a distributed antenna system further comprises collecting information describing the downlink signals from User Equipment (UE) including peak data rates of the downlink signals reported by the UE. Collecting information may further comprise collecting maximum sustainable data rates of the downlink signals reported by the UE and collecting the number of UEs having a QOS (Quality of Service) exceeding a QOS threshold. Varying the gain of the antenna units may comprise reducing gain of one or more antenna units to reduce multipath interference. Varying the gain of the antenna units may comprise varying a total gain of the distributed antenna system. Varying the gain of the antenna units may also comprise varying a link gain of an individual antenna unit. The antenna units may be grouped in indoor spaces separated by internal walls and varying the gain of the antenna units may comprise independently varying the gain of groups of the antenna units.

In another aspect the present invention provides a method for optimizing downlink transmission power of a distributed antenna system, comprising transmitting common downlink signals having a first power level from a first antenna unit and a second antenna unit to User Equipment (UE), wherein the first antenna unit and the second antenna unit are physically separated, collecting information describing the downlink signals reported by the UE, determining when a downlink transmission power of the first antenna unit and second antenna unit should be updated based on the collected information, and transmitting downlink signals having a second power level from the first antenna unit and the second antenna unit.

In a preferred embodiment of the method for optimizing the downlink transmission power of a distributed antenna system, collecting information describing the downlink signals preferably comprises collecting downlink data rates of the downlink signals reported by the UE, collecting signal quality information of the downlink signals reported by the UE, and collecting location information reported by the UE. Determining when a downlink transmission power of the first antenna unit and second antenna unit should be updated may further comprise estimating a current average capacity based on the collected information and comparing the current average capacity to a prior average capacity. The second power level may be less than the first power level when the current average capacity is less than the prior average capacity. The second power level may be greater than the first power level when the current average capacity is greater than the prior average capacity. The method may further comprise comparing the second power level to a maximum power threshold, and, when the second power level exceeds the maximum power level, reducing the second power level to the first power level. Collecting information describing the downlink signals may further comprise collecting peak data rates of the downlink signals reported by the UE, collecting maximum sustainable data rates of the downlink signals reported by the UE, and collecting the number of UEs having a QOS (Quality of Service) exceeding a QOS threshold. Determining when a downlink transmission power of the first antenna unit and second antenna unit should be updated may further comprise estimating a current average capacity based on the collected information and comparing the current average capacity to a prior average capacity. The first antenna unit and the second antenna unit may be located indoors. The downlink signal may comprise a single sector carrier signal.

In another aspect the present invention provides a distributed antenna system, comprising a distributed antenna system service module providing a downlink signal and a first antenna unit and a second antenna unit coupled to the distributed antenna system service module by transmission cables to receive the downlink signal and configured for wirelessly transmitting the downlink signal, wherein the first antenna unit and the second antenna unit are physically separated. The distributed antenna system service module is configured for controlling the transmission power levels of the first and second antenna units based on collected information from a plurality of User Equipment (UEs) receiving the downlink signals from the antenna units and transmitting uplink information to the antenna units.

In one preferred embodiment of the distributed antenna system the first and second antenna units are located indoors and cover separate service areas of a single space. The distributed antenna system may further comprise a third antenna unit and a fourth antenna unit, coupled to the distributed antenna system service module by transmission cables and configured for wirelessly transmitting the downlink signal, wherein the third antenna unit and the fourth antenna unit are physically separated in a second space separated by walls from the first and second antenna units. The distributed antenna system service module may be configured for controlling the transmission power levels of the third and fourth antenna units based on collected information from a plurality of User Equipment (UEs) receiving the downlink signals from the third and fourth antenna units and transmitting uplink information to the antenna units in the second space.

Further features and aspects of the invention are set out in the following detailed description.

DETAILED DESCRIPTION OF THE INVENTION

Figure 1:
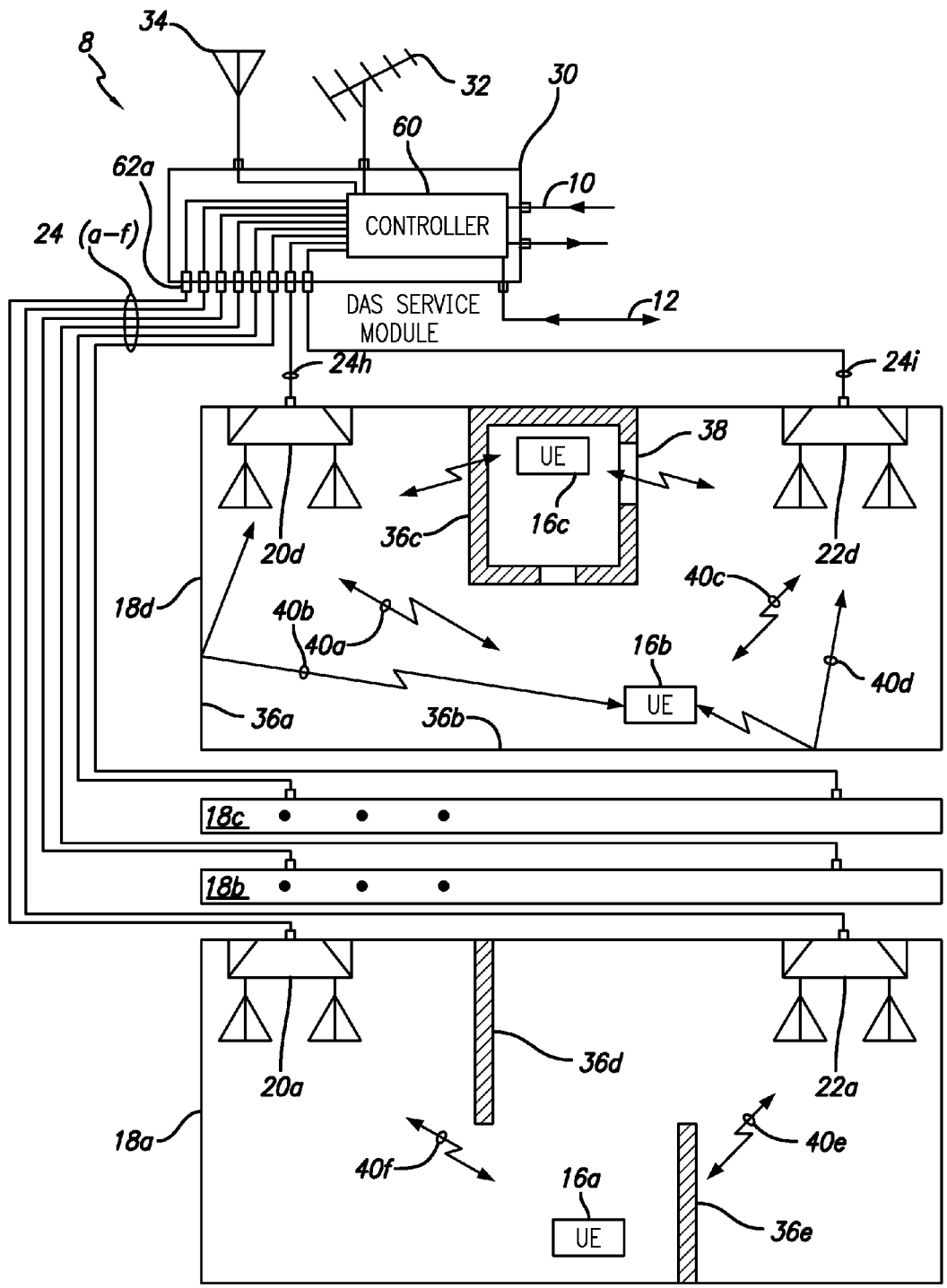
FIG. 1 is a representation of a distributed antenna system ("DAS") servicing multiple indoor rooms in accordance with the present invention.

It is an object of the present invention to provide a system and related methods for dynamically optimizing the performance of indoor distributed antenna systems for communicating to user equipment such as cellular telephones, smart phones, or other mobile devices. A major problem associated with indoor distributed antenna systems is multi-path fading. In an embodiment, the user equipment measures information describing the downlink signals transmitted by the antenna units such as the downlink data rates, the quality of the received signal, and the location of the user equipment. A service module collects this information and determines optimized power levels for each of the antenna units. The service module may optimize only one antenna unit or a subset of the antenna units within the distributed antenna system in a preferred embodiment. One or more of the antenna units then transmits downlink signals with the optimized power levels. The optimized power level may decrease in a preferred embodiment. As a result, the performance of the indoor distributed antenna systems is enhanced.

Modern mobile communications networks require enhanced efficiency and performance. These goals may be attained by increasing network capacity during peak usage hours, enhancing the data rates for mobile data devices while maintaining signal quality and network coverage, and reducing harmful interference to co-located wireless services. Modern smart phones transmit and receive both voice signals and data signals which place additional demands on the wireless system to respond to dynamically changing wireless traffic. Moreover, technological advances and evolution of communication standards place further demands on wireless service providers as the communication medium rapidly transitions from voice to on demand data.

Distributed antenna systems ("DAS") have been employed in indoor locations to provide better signal coverage, to improve network capacity, and to increase data rates in large office buildings, hospitals, stadiums, shopping malls, and outdoor venues such as college campuses. A typical DAS is a collection of small service antennas spread over a desired geographic area and connected by fiber or coax back to a donor node where base station signals are coupled onto DAS network. The DAS technology enables carriers to reduce gaps in coverage areas and dead spots in the macro network by partitioning the macro cell site into smaller regions.

Traditional deployments of DAS networks involve static engineering of DAS antenna units or nodes and remote units in which the antenna units operate with fixed target power levels per carrier. This traditional approach provides a certain quality of coverage in a given area. Traditional deployments only consider the macro signal path loss and signal strengths as part of the engineering exercise, but are unable to fine tune the system parameters to specific deployment scenarios or for specific capacity.

In traditional DAS systems (both passive and active), the received signal level of −75 dBm was used as a general design guideline for DAS systems. However, if these received signal levels lead to significant multipath, under some operational conditions it is highly advantageous to reduce received signal levels from −75 dBm down to −85 dBm if the orthogonality can be improved. This requires a DAS system capable to control the gain/transmitter power (and other operational parameters) remotely, at individual access nodes with the objective of optimizing the received signal levels (or path loss) to increase orthogonality in a specific environment and operational requirements.

Third generation systems such as 3G systems or 3.5 G HSDPA ("High-Speed Downlink Packet Access") systems support downlink speeds of 1.8, 3.6, 7.2 and 14.0 Mbit/s ("Megabits per second"). Higher downlink speeds are available with HSPA+, which provides downlink speeds of up to 42 Mbit/s and 84 Mbit/s with Release 9 of the 3GPP standards. OFDM ("Orthogonal Frequency Division Multiplexing") provides inherent advantages over CDMA ("Code Division Multiple Access") for systems having 10 MHz of bandwidth or more. Bandwidths in the range of 10 to 20 MHz are attainable with advanced antenna architectures such as Multiple Input Multiple Output ("MIMO") or Adaptive Antenna Systems ("AAS"). Extremely high peak data rates are attainable because OFDM requires less complex computations than those based on the CDMA protocol. HSDPA employs the modulation used in WCDMA of Quadrature Phase Shift Keying ("QPSK") and an advanced modulation scheme such as 16 Quadrature Amplitude Modulation ("16 QAM"). Depending on the condition of the radio channel, different levels of forward error correction (i.e., channel coding) can also be employed. For example, a three quarter coding rate requires that three quarters of the bits transmitted are user bits and one quarter of the bits are error correcting bits. The process of selecting and quickly updating the optimum modulation and coding rate is referred to as link adaptation.

A further advantage of HSDPA adaption is its full compatibility with WCDMA, and thus it can be deployed as a software only upgrade in newer WCDMA networks. Initially, Release 5 HSDPA capable devices will be capable of transmitting with 3.6 Mbps peak rates. Release 6 of an enhanced uplink protocol ("EUL"), also referred to as HSUPA ("High-Speed Uplink Packet Access"), will provide improved throughput, reduced latency, and increased capacity. EUL, as well as the Enhanced Dedicated Channel ("E-DCH"), provide data rates of up to 5.8 Mbps. The combination of HSDPA and EUL is called HSPA. To further boost the peak data rate and capacity, the 3GPP Release 7 introduced the HSPA evolution (also called HSPA+), which supports MIMO, 64QAM in the downlink, and 16QAM in the uplink. Release 8 supports downlink bitrates of 42 Mbps through a combination of 64QAM and MIMO or through using dual carriers with 64QAM modulation.

These technologies which support high data rates require radio link adaptation that fully utilizes channel capacity for each communication link in the wireless environment to maximize the throughput of scheduling-based systems. Conventional high data rate wireless links were deployed primarily in outdoor scenarios. Indoor wireless systems present additional challenges due to increased path losses and rapidly changing multipath signals which introduces complications into signal processing techniques supported by E-DCH. E-DCH was developed primarily for use in urban, suburban, and rural settings.

To address these indoor (in-building) deployment challenges, embodiments of the present invention provide a remotely manageable active DAS which enables dynamic system optimization based on operational parameters. These operational parameters include, but are not limited to, the peak data rate, the sustainable maximum data rate, the number of UEs ("User Equipment") at a given QOS ("Quality of Service") levels. DAS systems exhibit performance flexibility by employing co-operative multi-code optimization in HSPA. Systems employing the HSPA 7.2 protocol preferably operate in an environment without multi-path interference to obtain the full benefit of the code orthogonality.

Embodiments of the present invention contrast with conventional DAS systems. The conventional approaches, such as Release 7 MIMO on HSPA, suggest that the transmission signal strength should be increased to compensate for multi-path effects. Embodiments of the present invention may be applied to other Radio Access Technologies ("RATs") such as, but not limited to Wi-Fi, WiMax, and other developing technologies. RATS can be implemented in a neutral host active DAS, especially in high traffic situations with radio access loading and balancing and multi-mode, multi-band UEs, is readily affordable while providing high level QOS not otherwise possible with a single radio access implementation. Moreover, some deployments such as for a stadium, the DAS system needs to minimize gain in selected areas especially when having a cell split (i.e. sectorized DAS). The ability to selectively control the gain in overlapping regions will reduce inter-sector interference.

Embodiments of the present invention include a flexible remote management system that can optimize EIRP per antenna in the path by varying the total DAS gain and link gain in the path per antenna. Moreover, embodiments may vary individual repeater gain (as in case of low power zinwave nodes) with the objective of altering the effective channel in order to maximize system performance. Therefore, it is desirable to employ active DAS system and method that avoids above mentioned limitations while providing means for enhanced wireless service.

Simulations suggest that the active DAS system exhibits enhanced performance compared to conventional systems. The SINR ("Signal to Interference-plus-Noise Ratio") for the received signal on a HS-DSCH ("High Speed Downlink Shared Channel") is given by the following equation $$SINR_{HS-DSCH} = \frac{SF_{16} \cdot P_{HS-DSCH}}{(1-\alpha) \cdot P_{own} + P_{other} + N_o} \qquad \text{(Eqn. 1)}$$

where $\alpha$ is the orthogonality factor, $P_{own}$ is the total received power from the serving base station or antenna, $P_{HS-DSCH}$ is the total received power on the HS-DSCH channel, $P_{other}$ is the total received power from another base station, and $SF_{16}$ is the spreading factor of 16.

Equation 1 and the orthogonality factor $\alpha$ are well established parameters in analyzing performance of a HSPA network. A multipath environment can affect the orthogonality of the spreading codes, resulting in intra-cell interference from other codes. The impact of this is captured in the denominator of the equation by $(1-\alpha)*P_{own}$. Power from another code can result in self interference reducing SINR and, as a consequence, throughput.

TABLE 1

Simulated Performance of a DAS system

| Orthogonality Factor | Ec/Io −16 dB (Macro) | Ec/Io −13 dB (Macro) | Ec/Io −10 dB (DAS) |
|---|---|---|---|
| 0.4 | 250 | 402 | 1191 |
| 0.6 | 264 | 458 | 1665 |
| 0.8 | 279 | 537 | 2602 |
| 0.9 | 287 | 588 | 3599 |

Table I above is a simulation that illustrates the effects of the DAS. Ec/Io represents the energy per chip to interference ratio (another measure of SINR) that does not include the impact of the orthogonality factor $\alpha$. When the orthogonality factor is considered, the impact of lack of orthogonality is illustrated in Table I. For a Macro network with Ec/Io typically in range of −16 dB to −13 dB, throughput is as stated. However in a DAS network, Ec/Io is typically greater due to repeaters and may be −10 dB. However, to obtain the best performance, the orthogonality factor also has to be low. Note that the available link gain improved in the range of 62%-200%.

Table I illustrates a couple of aspects. First, one advantage of a DAS deployment improves the performance of the HSPA network (if the DAS power is set to provide −10 dB Ec/Io). Second, Table I illustrates the advantage of having a deployment with high degree of orthogonality. These two aspects highlight the importance of a DAS system that automatically adjusts the power of the DAS power amplifier until maximum performance is realized.

FIG. 1 is a representation of a DAS system 8 servicing multiple indoor rooms in accordance with the present invention. The DAS system 8 comprises a DAS Service Module 30 and multiple remote antenna units such as remote antenna units 20a and 22a. The DAS Service Module 30 comprises a controller 60 which is coupled to a fiber optic feed 10 for external communications, and a dedicated control and monitoring channel 12. A GPS antenna 34 and a donor service antenna 32 are also coupled to the controller 60. The controller is coupled to interfaces such as 62a, which are coupled to the remote antenna units via cables 24a-24f.

Interiors 18a-18d represents an outline of a floor or enclosed space such as multiple floors in an office building for example. The interiors 18a-18d may have internal obstructions such as walls 36a-36d. In this non-limiting example, each interior such as 18d may have two remote antenna units such as remote antenna units 20d and 22d. However, the use of one or more remote antenna units located throughout an interior is contemplated. The remote antenna units such as 20d and 22d communicate to the UEs such as UE 16c and 16b.

Each of these remote antenna units transmits downlink signals within an interior that travel multiple paths before reaching the UE. As a result, the UE receives a superposition of multiple copies of the transmitted signals which may result in constructive or destructive interference. This multi-path interference may significantly affect the quality of service provided to the user as the user moves within the interior. For example, UE 16b receives downlink signals directly from remote antenna units 20d and 22d via paths 40a and 40c respectively. In addition, UE 16b also receives downlink signals that were partially reflected by walls 36a and 36b via paths 40b and 40d respectively. Hence, the quality of the service to UE 16b depends on overall interference of the downlink signals that traversed paths 40a-40c. The user may experience differing levels of the quality of service as the user moves within the interior 18*d*.

In other scenarios, the downlink signals received by the UE may be attenuated as a result of shadowing. For example, UE 16*c* may receive an attenuated downlink signal from remote antenna unit 20*d* because the signal passes though wall 36*c*. The strength of the downlink signal from remote antenna unit 22*d* may be stronger because the UE 16 receives the downlink signal through opening 38. Similarly, UE 16*a* will receive a stronger transmission signal from remote antenna unit 20*a* because path 40*f* is an unobstructed path. The UE 16*a* will receive a weaker signal from remote antenna unit 22*a* because the path 40*e* is obstructed by wall 36*e*.

Hence, a DAS network 8 supporting a single carrier with multiple remote transmitters may optimize transmission power level for each remote antenna unit based on the supported technology and environment. Feedback information from the UEs or mobile stations relating to downlink rate or channel quality is solicited for each DAS cluster serving a given area. This feedback information is analyzed to determine average data rate in the served cluster. In the case of DAS network repeating a macro signal, GPS information from mobile stations could be used to constrain analysis only to the area served by DAS. The downlink transmission power from all DAS remote antenna units serving the cluster is increased in steps from $P_{initial}$. The algorithm continues to increase power until the cluster capacity saturates. This algorithm can be utilized for a cluster repeating a single sector signal or a cluster implementing reuse of the same frequency.

Figure 2:
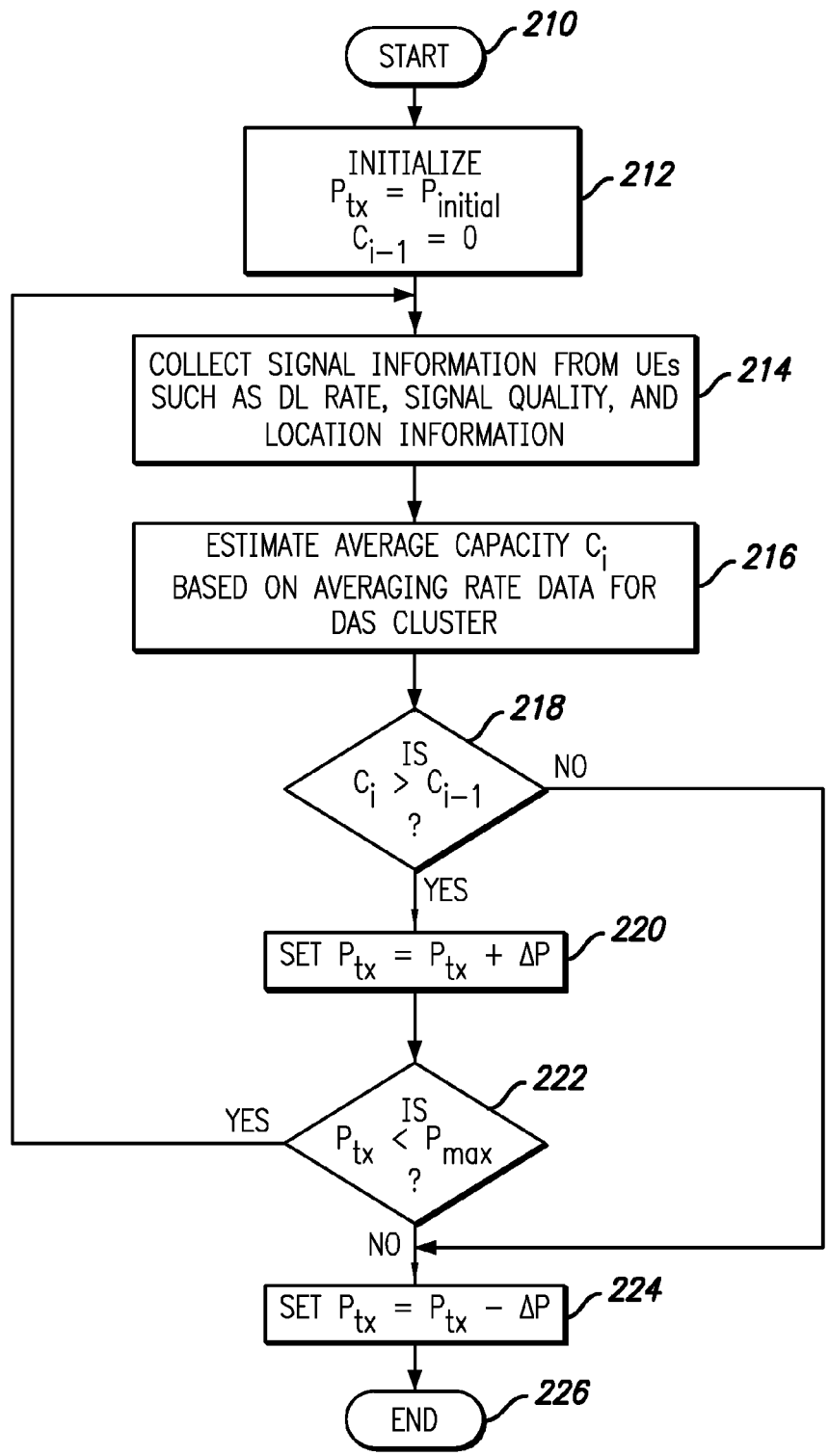
FIG. 2 is a flow chart illustrating an exemplary process for optimizing the downlink transmission power of remote antenna units within a distributed antenna system.

FIG. 2 is a flow chart illustrating an exemplary process for optimizing the downlink transmission power of the remote antenna units within a distributed antenna system 8. Essentially, the process collects signal information from the UEs and determines an average capacity $C_i$ of the system. If the capacity has improved since the prior iteration, the transmission power $P_{tx}$ increases and the next set of signal information is collected. On the other hand, if the average capacity $C_i$ has not improved since the prior iteration, the transmission power $P_{tx}$ is reduced. The transmission power $P_{tx}$ cannot exceed a maximum power level $P_{max}$.

Specifically, the process starts at step 210. The transmission power $P_{tx}$ is set to an initial power level $P_{initial}$ and the initial capacity $C_{i-1}$ is set to 0 (step 212). Signal information is collected from the UEs such as UE 16*b* and 16*c* (step 214). The signal information may include, but is not limited to, the downlink data rate, the download signal quality received by the UE, the location information of the UE, the peak data rates, the maximum sustainable data rates of the downlink signals, and/or the number of UEs having a QOS ("Quality of Service") exceeding a QOS threshold. The average capacity $C_i$ is estimated based on the collected signal information for the DAS cluster (step 216). The current estimated capacity $C_i$ is compare to the prior average capacity $C_{i-1}$ (step 218). If the average capacity of the system has improved, the process proceeds to step 220. If the capacity has not improved, the process proceeds to step 224 which reduces the transmission power $P_{tx}$ and terminates at step 226. The transmission power $P_{tx}$ is increased and is set to $P_{tx}+\Delta P$ (step 220). In an embodiment, the transmission power $P_{tx}$ is increased for all remote antenna units such as remote antenna units 20*d* and 22*d*. The transmission power $P_{tx}$ is increased for only one remote antenna such as only remote antenna 20*d* or a subset of all remote antenna units in a preferred embodiment. The transmission power $P_{tx}$ is then compared to a maximum transmission power $P_{max}$ (step 222). The maximum transmission power $P_{max}$ may be the maximum power for an individual remote antenna unit, or may be the maximum transmission power for a set of remote antenna units, or may be the maximum transmission power of the entire DAS system 8. If the transmission power $P_{tx}$ is less than the maximum transmission power $P_{max}$, the process proceeds to step 214. Otherwise, the process proceeds to step 224. The transmission power $P_{tx}$ is reduced and is set to $P_{tx}-\Delta P$ (step 224). The process terminates at step 226.

As discussed above, the presence of an indoor, scattering environment is detrimental. Moreover, signals from neighboring remote antenna units may add to the multi-path fading. For such scenarios, it may benefit to actually reduce the downlink transmission power from each remote antenna unit to the level that minimizes the overall spread.

The present invention has been described primarily as a system and means for dynamically optimizing the transmission power levels for downlink signal s transmitted from a distributed antenna system to user equipment such as cellular telephones or smart phones. In this regard, the system and means for optimizing transmission power levels for downlink signals are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for optimizing downlink transmission power of a distributed antenna system, comprising:
   providing a common downlink signal to a plurality of separate antenna units in a distributed antenna system; and,
   varying gain of one or more of the antenna units to enhance system performance based on collected user information.

2. The method for optimizing the downlink transmission power of a distributed antenna system as set out in claim 1, further comprising collecting information describing the downlink signals from User Equipment (UE) including peak data rates of the downlink signals reported by the UE.

3. The method for optimizing the downlink transmission power of a distributed antenna system as set out in claim 2, wherein collecting information further comprises:
   collecting maximum sustainable data rates of the downlink signals reported by the UE; and,
   collecting the number of UEs having a QOS (Quality of Service) exceeding a QOS threshold.

4. The method for optimizing the downlink transmission power of a distributed antenna system as set out in claim 1, wherein varying the gain of one or more of the antenna units comprises reducing gain of one or more antenna units to reduce multipath interference.

5. The method for optimizing the downlink transmission power of a distributed antenna system as set out in claim 1, wherein varying the gain of the antenna units comprises varying a total gain of the distributed antenna system.

6. The method for optimizing the downlink transmission power of a distributed antenna system as set out in claim 1, wherein varying the gain of one or more of the antenna units comprises varying a link gain of an individual antenna unit.

7. The method for optimizing the downlink transmission power of a distributed antenna system as set out in claim 1, wherein the antenna units are grouped in indoor spaces separated by internal walls and wherein varying the gain of one or more of the antenna units comprises independently varying the gain of groups of the antenna units.

8. A method for optimizing downlink transmission power of a distributed antenna system, comprising:
   transmitting common downlink signals having a first power level from a first antenna unit and a second antenna unit to User Equipment (UE), wherein the first antenna unit and the second antenna unit are physically separated;
   collecting information describing the downlink signals reported by the UE;
   determining when a downlink transmission power of the first antenna unit and second antenna unit should be updated based on the collected information; and,
   transmitting downlink signals having a second power level from the first antenna unit and the second antenna unit.

9. The method for optimizing the downlink transmission power of a distributed antenna system as set out in claim 8, wherein collecting information describing the downlink signals comprises:
   collecting downlink data rates of the downlink signals reported by the UE;
   collecting signal quality information of the downlink signals reported by the UE; and,
   collecting location information reported by the UE.

10. The method for optimizing the downlink transmission power of a distributed antenna system as set out in claim 9, wherein determining when a downlink transmission power of the first antenna unit and second antenna unit should be updated comprises:
    estimating a current average capacity based on the collected information; and,
    comparing the current average capacity to a prior average capacity.

11. The method for optimizing the downlink transmission power of a distributed antenna system as set out in claim 10, wherein the second power level is less than the first power level when the current average capacity is less than the prior average capacity.

12. The method for optimizing the downlink transmission power of a distributed antenna system as set out in claim 10, wherein the second power level is greater than the first power level when the current average capacity is greater than the prior average capacity.

13. The method for optimizing the downlink transmission power of a distributed antenna system as set out in claim 10, further comprising:
    comparing the second power level to a maximum power threshold; and,
    when the second power level exceeds the maximum power level, reducing the second power level to the first power level.

14. The method for optimizing the downlink transmission power of a distributed antenna system as set out in claim 9, wherein collecting information describing the downlink signals further comprises:
    collecting peak data rates of the downlink signals reported by the UE;
    collecting maximum sustainable data rates of the downlink signals reported by the UE; and,
    collecting the number of UEs having a QOS (Quality of Service) exceeding a QOS threshold.

15. The method for optimizing the downlink transmission power of a distributed antenna system as set out in claim 14, wherein determining when a downlink transmission power of the first antenna unit and second antenna unit should be updated further comprises:
    estimating a current average capacity based on the collected information; and,
    comparing the current average capacity to a prior average capacity.

16. The method for optimizing the downlink transmission power of a distributed antenna system as set out in claim 8, wherein the first antenna unit and the second antenna unit are located indoors.

17. The method for optimizing the downlink transmission power of a distributed antenna system as set out in claim 8, wherein the downlink signal comprises a single sector carrier signal.

18. A distributed antenna system, comprising:
    a distributed antenna system service module providing a downlink signal; and
    a first antenna unit and a second antenna unit coupled to said distributed antenna system service module by transmission cables to receive said downlink signal and configured for wirelessly transmitting said downlink signal, wherein the first antenna unit and the second antenna unit are physically separated;
    wherein said distributed antenna system service module is configured for controlling the transmission power levels of the first and second antenna units based on collected information from a plurality of User Equipment (UEs) receiving the downlink signals from the antenna units and transmitting uplink information to the antenna units.

19. The distributed antenna system as set out in claim 18, wherein the first and second antenna units are located indoors and cover separate service areas of a single space.

20. The distributed antenna system as set out in claim 19, further comprising:
    a third antenna unit and a fourth antenna unit, coupled to said distributed antenna system service module by transmission cables and configured for wirelessly transmitting said downlink signal, wherein the third antenna unit and the fourth antenna unit are physically separated in a second space separated by walls from the first and second antenna units; and,
    wherein the distributed antenna system service module is configured for controlling the transmission power levels of the third and fourth antenna units based on collected information from a plurality of User Equipment (UEs) receiving the downlink signals from the third and fourth antenna units and transmitting uplink information to the antenna units in said second space.

* * * * *